(12) United States Patent
Oder et al.

(10) Patent No.: US 7,360,657 B2
(45) Date of Patent: Apr. 22, 2008

(54) CONTINUOUS MAGNETIC SEPARATOR AND PROCESS

(75) Inventors: Robin R. Oder, Export, PA (US); Russell E. Jamison, Lower Burrell, PA (US)

(73) Assignee: Exportech Company, Inc., New Kensington, PA (US)

( * ) Notice: Subject to any disclaimer, the term of this patent is extended or adjusted under 35 U.S.C. 154(b) by 416 days.

(21) Appl. No.: 10/502,861

(22) PCT Filed: Jan. 31, 2003

(86) PCT No.: PCT/US03/02877

§ 371 (c)(1), (2), (4) Date: Jul. 28, 2004

(87) PCT Pub. No.: WO03/064050

PCT Pub. Date: Aug. 7, 2003

(65) Prior Publication Data

US 2005/0035030 A1    Feb. 17, 2005

(51) Int. Cl.
*B03C 1/00* (2006.01)

(52) U.S. Cl. .................. 209/223.1; 209/636; 209/214; 209/213

(58) Field of Classification Search ........... 209/636, 209/213, 214, 216, 223.1, 223.2, 228, 231, 209/232; 210/222, 223, 695
See application file for complete search history.

(56) References Cited

U.S. PATENT DOCUMENTS

| 2,789,655 A | 4/1957 | Michael et al. |
| 3,399,134 A | 8/1968 | Schouw et al. |
| 3,676,337 A | 7/1972 | Kolm |
| 3,902,994 A | 9/1975 | Maxwell et al. |
| 3,920,543 A | 11/1975 | Marston et al. |
| 4,261,815 A | 4/1981 | Kelland |
| 4,605,678 A | 8/1986 | Brennan et al. |
| 4,663,029 A | 5/1987 | Kelland et al. |

(Continued)

FOREIGN PATENT DOCUMENTS

JP    358114709 A    7/1983

(Continued)

OTHER PUBLICATIONS

Mining Industry of the Future; Mineral Processing Technology Roadmap; 20 pages; Sep. 2000.

(Continued)

*Primary Examiner*—Patrick Mackey
*Assistant Examiner*—Mark Hageman
(74) *Attorney, Agent, or Firm*—Barbara E. Johnson

(57) ABSTRACT

A continuous magnetic separator and process for separating a slurry comprising magnetic particles into a clarified stream and a thickened stream. The separator has a container with a slurry inlet, an overflow outlet for the discharge of the clarified slurry stream, and an underflow outlet for the discharge of a thickened slurry stream. Magnetic particles in the slurry are attracted to, and slide down, magnetic rods within the container. The slurry is thus separated into magnetic concentrate and clarified slurry. Flow control means can be used to control the ratio of the rate of magnetic concentrate to the rate of clarified slurry. Feed control means can be used to control the rate of slurry feed to the slurry inlet.

14 Claims, 9 Drawing Sheets

U.S. PATENT DOCUMENTS

| | | | |
|---|---|---|---|
| 4,764,287 A * | 8/1988 | Colman et al. | 210/788 |
| 4,946,589 A | 8/1990 | Hayes | |
| 5,169,006 A | 12/1992 | Stelzer | |
| 5,520,890 A | 5/1996 | Lorentzen et al. | |
| 5,868,255 A * | 2/1999 | McGaa | 209/39 |
| 5,868,939 A | 2/1999 | Oder et al. | |
| 5,871,642 A | 2/1999 | Meeks | |
| 5,909,813 A | 6/1999 | Stelzer | |
| 6,077,333 A | 6/2000 | Wolfs | |
| 6,099,738 A * | 8/2000 | Wechsler et al. | 210/695 |
| 6,099,739 A | 8/2000 | Kobayashi | |
| 6,193,071 B1 | 2/2001 | Stelzer | |
| 7,147,788 B2 * | 12/2006 | Tveiten | 210/788 |
| 2002/0157992 A1 * | 10/2002 | McGaa | 209/39 |
| 2003/0183580 A1 | 10/2003 | Schaaf et al. | |

FOREIGN PATENT DOCUMENTS

| JP | 363296886 A | 12/1988 |
|---|---|---|

OTHER PUBLICATIONS

R.R. Oder; "The Application Of High Field And High Gradient Methods To The Magnetic Separation Of Mineral Matter From Micronized Coal"; Separation Science And Technology, 19(11 & 12), pp. 761-781, 1984-1985.

Magnetic Corporation of America; "Coal Preparation Using Magnetic Separation"; Vol. 2; 80 pages; Jul. 1980.

John J. Marano and Gerald D. Holder; "Prediction Of Bulk Properties Of Fischer-Tropsch Derived Liquids"; Ind. Eng. Chem. Res. 1997; 36; pp. 2409-2420.

Peter Campbell; "Permanent Magnet Materials And Their Application"; Press Syndicate of Cambridge University; 36 pages; 1994.

Burns and Roe Services Corp.; "Status Review Of Fischer-Tropsch Slurry Reactor Catalyst/Wax Separation Techniques"; Feb. 1991; 64 pages.

* cited by examiner

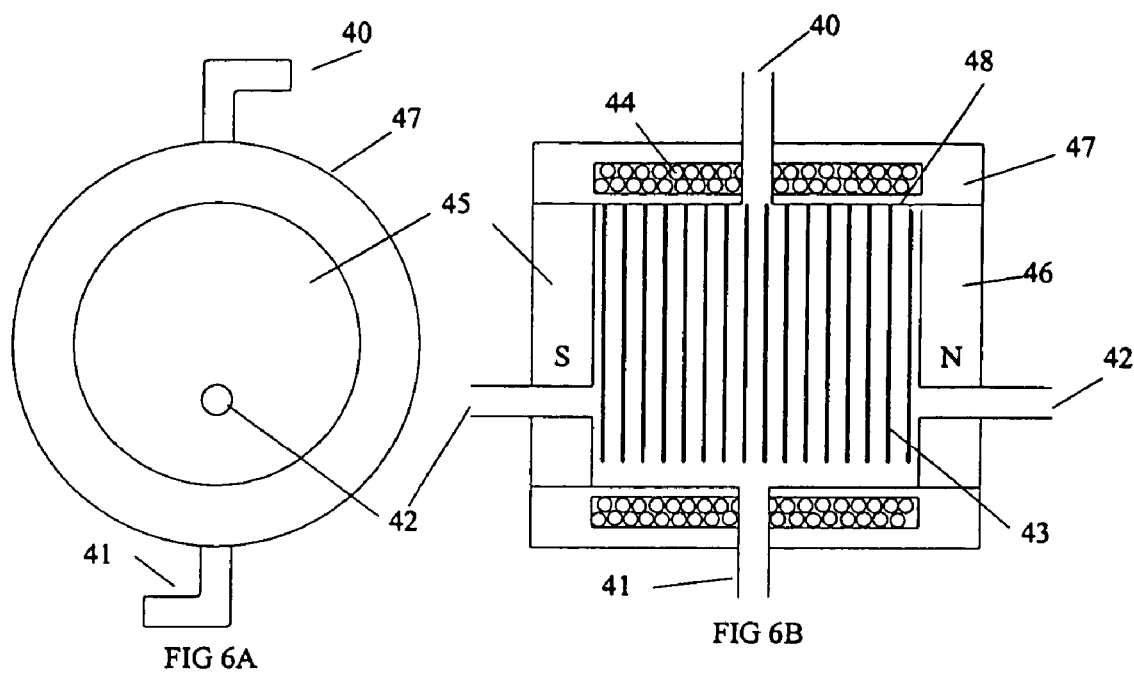
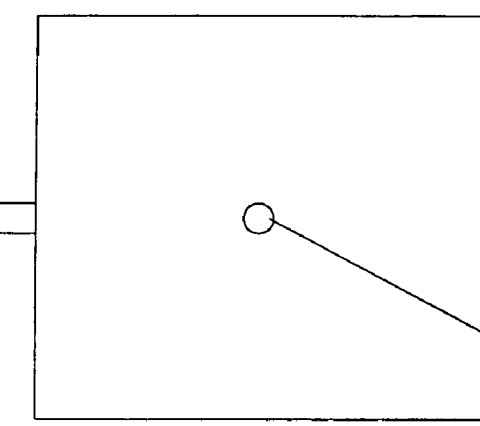
FIG 6A
FIG 6B
FIG 6C

CONTINUOUS MAGNETIC SEPARATOR AND PROCESS

This invention was made with Government support under Grant DE-FG02-00ER83008 awarded by the United States Department of Energy. The Government has certain rights in this invention.

BACKGROUND OF THE INVENTION

1. Field of the Invention

This invention relates to an apparatus and methods for continuous separation of magnetic particles from a slurry.

2. Description of the Prior Art

There are a number of circumstances where it would be desirable to continuously separate magnetic particles from a slurry. One example is separation of magnetic catalyst particles from a slurry in a slurry reaction system, such as a slurry phase Fisher-Tropsch synthesis wherein carbon monoxide and hydrogen are reacted to form hydrocarbons in the presence of an iron catalyst. The reactor contains a three phase mixture of gases and a slurry of fine catalyst particles in the hydrocarbons. The success of the iron-based process depends on the ability to economically separate the catalyst from the hydrocarbon products, which often comprise viscous waxes. Another example is separation of magnetic particles from oil which is produced while milling steel such as in production of sheet steel in a rolling mill where oil is constantly sprayed onto the rollers resulting in a slurry of iron particles in the oil. Removal of the iron particles would allow for more efficient use of the oil. Other applications are to be found in separation of: chemical compounds or magnetically doped beads in drug and medicine manufacturing, catalysts used in the petroleum chemicals industries, contaminants in soil remediation, and magnetic components of industrial off-gases. Generally, the technology can be used in a wide range of applications in the mining industry where processing and recovery of particles in the 5 to 100 micron size range is problematical using state-of-the-art magnetic separation as discussed in "Mineral Processing Technology Roadmap," U.S. Department of Energy, Office of Industrial Technologies, September, 2000.

In the past, solids separation in slurry phase Fisher-Tropsch systems has involved complex mechanical filtration systems performed outside the slurry reactor. Other slurry reaction systems have used batch operated mechanical filtration elements within the slurry reactor to remove catalytic particles from the slurry. In U.S. Pat. No. 5,520,890, Loretzen teaches a Fischer-Tropsch reactor containing a number of vertical reaction tubes, each vertical tube having a filter element (typically a screen) at the top of each tube to produce a filtrate zone above the filter element and retain the catalyst particles within the tube. A heat transfer fluid is circulated in the volume outside of the tubes to remove the exothermal heat of reaction. This system relies on controlling pressure variations across the filter element and fluid communication between a gas space above the filtrate zone and any gas space above the slurry in the tubes to prevent buildup of particles on the filtration elements and resultant need for back flushing to remove the solids and unplug the elements. This reactor has the difficulty of added operation constraints to control the filter elements and need for occasional back flushing.

The use of magnetic separation devices for removing magnetic particles from a slurry is well known. One method is High Gradient Magnetic Separation (HGMS) such as disclosed by Kolm, U.S. Pat. No. 3,676,337 wherein particles are attracted to and trapped in a magnetized filter element containing a matrix such as steel wool based on high magnetic field gradients created by the magnetized matrix. At some point the capacity of the matrix is reached and it is necessary to turn off the magnetic field and flush the particles out with a flowing liquid. A variant on the Kolm HGMS is U.S. Pat. No. 3,902,994 to Marston, which discloses a plurality of matrix containing elements on a carousel, so that one or more elements can be cleaned while another is in service.

An example of an external magnetic filtration system used in a slurry Fisher-Tropsch system was disclosed by Brennan in U.S. Pat. No. 4,605,678, in which two or more alternating high gradient magnetic separators were used to remove iron catalyst from the wax product. Slurry was passed through one of the separators wherein the high gradient magnetic field caused catalyst particles to be retained in a magnetized steel wool filtration element. In this process, the filtration was of necessity batch with respect to the high gradient magnetic separators. Periodically, the catalyst was removed from the filtration elements by demagnetizing the element and back flushing with a liquid so that catalyst could be recycled. During back flushing another separator was used. High gradient magnetic separation was quite effective in removing the catalyst particles, removing over 99% of the catalyst. However, the use of a batch filtration process is undesirable in an otherwise continuous reaction system. In particular, the concentration of catalyst in the slurry (20 or 30 wt. percent) is higher than desirable as a feed-stock for high gradient magnetic separation which is best used as a polishing separator with concentrations of the magnetic fraction of the feed in the 2% to 3% range. Conventional HGMS methods are restricted when the concentration of magnetics in the feed exceeds this range, because of excessive capture-matrix loading which leads to poor non-magnetics weight yields. This effect has been discussed in the following paper which is hereby incorporated herein by reference: R. R. Oder, "The Application of High Field and High Gradient Methods to the Magnetic Separation of Mineral Matter from Micronized Coal," Separation Science and Technology. 19 (11&12), pp. 761-781, 1984-85. Application of carousel as described in Marston (U.S. Pat. No. 3,920,543) and reciprocating as discussed in "Coal Preparation Using Magnetic Separation," Volume 2, CS-1517, Volume 2 Research Project 980-2 Prepared by Magnetic Corporation of America, Z. J. J. Stekly, Principal Investigator, which are hereby incorporated herein by reference, show that HGMS units will be problematical for the Fischer-Tropsch application because of the complexity of the apparatus and incompatibility with high temperature and high pressure.

Another type of magnetic separator separates particles in a slurry from each other according to their susceptibility or charge as opposed from removing particles from the liquid in the slurry as in the HGMS separators. This type of separator is useful for selective separation of components of complex particle systems. Such devices are often in the form of an elongated housing with a slurry feed at the top and a number of outlet channels at the bottom for collection of slurries concentrated with solids of differing magnetic properties. One such device, disclosed by Kelland in U.S. Pat. No. 4,261,815 utilizes a plurality of ferromagnetic rods located within the housing and oriented along the axis of the housing. Downstream of each rod are four channels for collection of slurries relatively concentrated in particles having different magnetic properties. Another variant by Kelland is U.S. Pat. No. 4,663,029 in which a single rod is located outside and adjacent to an elongated canister parallel to the axis of the canister. The canister has an inlet at the top and a plurality of outlet ports at the bottom for collection of particles according to their size and magnetic susceptibility.

A somewhat related separator is disclosed by Stelzer in U.S. Pat. No. 5,169,006, wherein a magnetic separator comprises an elongated housing with flow inlet at one end and a number of channels at the other end, with a three dimensional array of rods within the housing which are perpendicular to the direction of flow. The rods are comprised of alternating ferromagnetic and non-ferromagnetic sections. An improvement on the above separator was disclosed by Stelzer in U.S. Pat. No. 5,909,813 and U.S. Pat. No. 6,193,071 wherein a magnetic separator comprises an elongated housing with a feed slurry inlet at one end and multiple outlets at the other end. Inside the housing a plurality of ferromagnetic rods are disposed at an angle between parallel and perpendicular with the rods terminating at opposite sides of the housing. A force gradient is created between adjacent rods by providing an external magnetic field with a field direction parallel to the direction of slurry flow. In one variant triangular cross section rods were employed. Particles are deflected into the different channels by the rods.

In U.S. Pat. No. 5,868,939 Oder disclosed a continuous magnetic separator for breaking emulsions of immiscible liquids by magnetostatic coalescence. One embodiment of that device comprises a vertical separator means having an inlet below a top and above a bottom, outlets at the top and bottom for separately withdrawing a continuous phase and a coalesced phase containing a magnetic additive and a magnetic field in a horizontal plane perpendicular to the direction of flow. The above device may comprise vertical magnetic rods onto which the magnetically doped dispersed phase coalesces and flows to the bottom of the separator where there is an interface between the continuous phase and the coalesed magnetically doped dispersed phase. Thus the use of this separator is limited to separation of emulsified liquid phases and the means for controlling the outlet flows was limited to controlling the depth of a "magnetic plug" of the coalesced phase as would apply to a liquid-liquid separation.

The existing art for carrying out slurry phase reactions, such as Fischer-Tropsch synthesis conducted using magnetic catalyst particles, shows a need for improved methods and apparatuses which provide for continuous separation of relatively finely divided magnetic catalyst particles from the liquid component of the slurry. In a continuous slurry reactor system, a particularly desirable form of separation would be a device which acts as both a continuous clarifier and thickening device wherein a slurry stream would be continuously separated into a substantially catalyst free liquid product and a concentrated catalyst slurry. The slurry would be recycled to the reactor to recover catalyst. Those skilled in the art will appreciate that continuous flow separations are greatly preferred to batch and semi-batch separations such as filtration. An ideal device would look very much like a continuous settler, though those skilled in the art will appreciate that sedimentation is not generally practical for separating fine particles in a pressurized system since the separation rates are often be too low resulting in the need for too large a pressurized sedimentation vessel to be practical.

There is a similar need for a continuous magnetic separator for separation of finely divided magnetic particles from liquids such a lubrication oil so as to continuously produce a clarified oil and a thickened slurry of magnetic particles from a feed slurry.

A still further need is for a truly continuous magnetic separation apparatus and method which could be incorporated within a slurry reactor involving a slurry comprising magnetic particles.

SUMMARY OF THE INVENTION

This invention pertains to continuous magnetic separators and methods for continuously separating a feed slurry comprising magnetic particles in a liquid, into an overflow having a lower concentration of magnetic particles than the feed slurry and an underflow having a higher concentration of magnetic particles than the feed. The magnetic particles preferably comprise strongly magnetic particles, most preferably those exhibiting forms of collective magnetism such as ferromagnetism, antiferromagnetism, or superparamagnetism and preferably paramagnetic particles with field induced magnetic moments greater than or equal to 1 emu/gm in the magnetic field employed in the continuous separator. The particles may range in size from nominally a millimeter down to sub-microns. Most preferably they range in size from a few hundred microns down to one micron. The upper limit on the particle size is determined by requirements for a stable flowable suspension. At this time, the lower limit on particle size is not known. Their concentration in the slurry fed to the separator should be low enough for the slurry to flow, most preferably lower than 50 Wt. % of the slurry.

A continuous magnetic separator according to the invention is an apparatus comprising a container, the container comprising a slurry inlet, an overflow outlet, and an underflow outlet. The overflow outlet is disposed at approximately the top of separator, the underflow outlet is disposed at approximately the bottom of the separator and the slurry inlet is disposed to deliver slurry feed between the overflow and the underflow. The apparatus further comprises at least one magnetic rod disposed approximately vertically within the container. Preferably, there is more than one magnetic rod. At least one rod may be made of a permanent magnet material or may be of a magnetically soft material such as carbon steel or ferritic stainless steel which is magnetized by an external magnetic field produced by an electromagnet, a superconducting magnet, or a permanent magnet, the field being substantially transverse to the substantially vertical orientation of the rods. The container should be made from a nonmagnetic material such as the austenitic stainless steels.

When a slurry of magnetic particles is fed into the slurry inlet, the magnetic particles are attracted to the magnetic rods and are made to slide down the magnetic rods by gravity and flow forces to form a magnetic concentrate, which is a concentrated slurry of magnetic particles, which flows out through the underflow outlet, while a clarified stream produced by removal of magnetic particles from the slurry flows out through the overflow outlet. It is preferable to control the performance of the separator by controlling the feed rate to the separator and varying the ratio of the magnetic concentrate withdrawal rate to the clarified stream withdrawal rate, the magnetic concentrate withdrawal rate being enough to force particles down the rods and out of the underflow outlet. The preferred embodiment of the continuous magnetic separator further comprises flow control means for controlling this ratio. Examples of flow control means include valves, flow restrictions, and pumps located in series with the overflow outlet and/or underflow outlet. The preferred embodiment still further comprises means for controlling the slurry feed rate to the separator. The preferred means for controlling feed rate includes valves, flow restrictions and pumps in series with the inlet. For a particular separator the preferred means of controlling the feed rate and ratio of underflow rate to overflow rate depends on the environment in which the continuous magnetic separator is used.

In one environment, the continuous magnetic separator is operated decoupled from the source of slurry, with the slurry being stored in a storage vessel. This environment is typical, for example, for separating magnetic particles from lubricating oil or of separating magnetite particles from a suspension of coal and magnetite used to separate mineral impurities from coal. In this case the feed rate can be controlled using a control valve if the slurry is stored under an approximately constant pressure or with a controllable output pump if the slurry pressure is insufficient or not sufficiently constant. Once the feed rate is set constant, the split between the input and output will preferably be controlled by valves or flow restrictors on one or both of the streams, or a pump on one stream, or a pump on one stream and a valve or flow restrictor on the other.

In another environment, the continuous magnetic separator is directly coupled with the source of slurry feed. One particularly attractive environment occurs when a continuous magnetic separator is used to separate magnetic particles from the slurry in a slurry phase reaction system such as Fischer-Tropsch synthesis. In a slurry phase Fischer-Tropsch process synthesis gas comprising carbon monoxide and hydrogen is added to a slurry phase in a reactor which is at appropriate elevated temperature and pressure. The slurry phase is made of a liquid phase comprising hydrocarbons produced from the synthesis gas, including waxes. The solid phase comprises catalyst particles. A common catalyst family for Fischer-Tropsch synthesis comprise iron as a major component and are strongly magnetic. In a slurry phase Fischer-Tropsch process the liquid phase is a portion of the hydrocarbon product which is formed by the catalytic reaction of carbon monoxide and hydrogen. The liquid contains waxes that will generally be upgraded by refining processes. It is necessary to remove the catalyst particles from the liquid in order to facilitate further refining of the liquid as well as to recover the valuable catalyst for recycle.

In one preferred embodiment involving coupling the continuous magnetic separator with a slurry reactor, the continuous magnetic separator is located within the reactor slurry zone so that the clarified liquid is removed from the slurry zone through an outlet from the reactor and the magnetic concentrate slurry is returned to the reactor slurry zone, preferably at a position near the bottom of the slurry zone. In this embodiment the slurry is preferably continuously pumped into the slurry inlet by a pump that draws slurry from the reactor slurry zone. The pump may be of the type that is internal to the reactor, such as a canned pump, or may be outside of the reactor drawing slurry through a nozzle extending through the reactor wall. In this case the split between overflow and underflow is preferably controlled by control valves or flow restrictors on either the overflow outlet, the underflow outlet or both.

In a second preferred embodiment involving coupling the continuous magnetic separator with a slurry source, such as a reactor, the continuous magnetic separator is located outside of the slurry source. In this embodiment the slurry feed rate is set by the rate of production of the slurry. It will be desirable to introduce the slurry into the continuous separator under pressure to assure continuous flow. It will also be desirable to control the split between the overflow and the underflow with valves or pumps on the overflow outlet or the underflow outlet or both.

In any of the above embodiments, it may be desired to further remove additional magnetic particles from the clarified liquid in a secondary continuous magnetic separation unit. If the particle size distribution of the particles in the feed to the continuous magnetic separator is very broad, it may be necessary to use more than one continuous separator in series, sending the clarified liquid from the first continuous separator to the inlet of a second continuous separator which is designed to separate smaller particles of lower concentration than is the first continuous separator.

Processing a simulated Fischer-Tropsch reactor slurry containing about 20% (wt.) of magnetic catalyst particles with a continuous magnetic separator according to this invention produced a clarified liquid of 0.2% (wt.) solids. No separation was observed when slurry was processed through the separator without the rods magnetized.

The magnetic separator is capable of treating very small particles. In the example above, 78% of the particles fed to the separator were smaller than 10 microns.

It is an object of the invention to provide improved methods and apparatus for continuous separation of magnetic particles from a slurry of magnetic particles in a liquid.

It is an object of the invention to provide a magnetic separator of the type which produces a continuous clarified overflow stream and a continuous underflow stream which is concentrated in magnetic particles from a continuous feed stream comprising a slurry of strongly magnetic particles in a liquid.

It is a further object of the invention to provide improved methods and apparatus for recovery of magnetic solid particles from a reactor slurry in a slurry phase reaction system.

It is a still further object of the invention to provide improved methods and apparatus for producing clarified liquid in slurry phase reactions involving magnetic solid particles.

It is a still further object of the invention to provide improved methods ard apparatus for continuous recovery of magnetic catalyst particles and clarified waxy liquid product in a slurry phase Fischer-Tropsch reaction.

BRIEF DESCRIPTION OF THE DRAWINGS

These and other features, aspects and advantages of the present invention will become better understood with regard to the following description, appended claims and accompanying drawings, where:

FIGS. 6A, 6B and 6C are an end view, a front view of a vertical section through the center, and a top view of a continuous magnetic separator housed within a horizontal solenoidal magnet with transverse access at the top and bottom of the separator midway along its length.

DESCRIPTION OF THE PREFERRED EMBODIMENTS

This invention employs methods and apparatus for continuous magnetic separation to separate solid magnetic particles from slurry. The particles may be as coarse as the coarsest particle which is stable in suspension under the flow conditions used. The lower particle size which is separable is not know at this time. Preferably the size consist will be a few hundred microns topsize with one micron bottom size. In the context of this invention, a continuous magnetic separator is a magnetic separator which achieves a steady state where it receives a continuous flow of slurry feed and continuously separates it into a clarified liquid overflow and an underflow magnetic concentrate of the magnetic particles. "Continuous" is used in the ordinary chemical engineering sense which refers to the fact that in normal operation the separator achieves a steady state flow condition where the sum of the overflow and underflow rates equals the inlet flow rate. A continuous magnetic separator is specifically distinguished from a batch separator where one component, generally the magnetic solid, is retained in the separator and periodically removed. The continuous separator is also distinguished from a sequence or carrousel of batch reactors that are sequenced to simulate steady flow. In the context of this invention, continuous does not imply that a separator operate without occasional shutdowns or changes in operation.

The continuous magnetic separator of this invention is also specifically distinguished from other so-called continuous magnetic separators that separate the magnetic solids from each other based on the magnetic properties of the solids. The continuous magnetic separator of this invention refers to a device that continuously separates a suspension into a clarified stream and a concentrated slurry of the magnetic solids.

A continuous magnetic separator according to the invention is an apparatus comprising a container, the container comprising a slurry inlet, an overflow outlet, and an underflow outlet. The overflow outlet is disposed at approximately the top of separator, the underflow outlet is disposed at approximately the bottom of the separator and the slurry inlet is disposed to deliver slurry feed between the overflow and the underflow. The apparatus further comprises at least one magnetic rod disposed approximately vertically within the container. Preferably, there is more than one magnetic rod. At least one rod may be made of a permanent magnet material or may be of a magnetically soft material such as carbon steel or ferritic stainless steel which is magnetized by an external magnetic field produced by an electromagnet or superconducting magnet or a permanent magnet, the field being substantially transverse to the substantially vertical orientation of the rods. The container can be made from any suitable nonmagnetic material such as, for example, austenitic stainless steel.

Figure 1A:
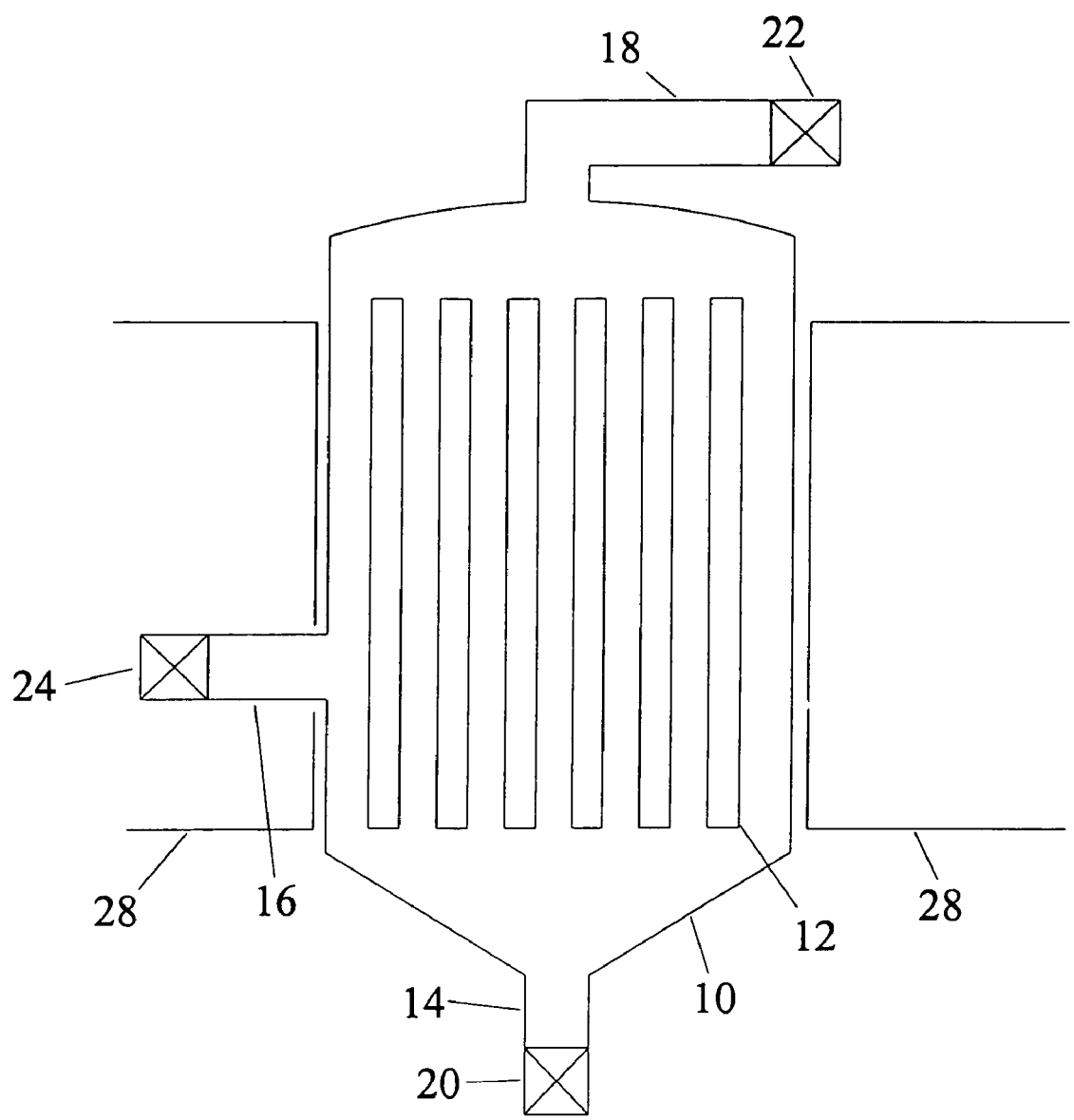
FIG. 1A is a schematic front view of a continuous magnetic separator using valves to control the inlet feed slurry rate and overflow and underflow rates.
Figure 1B:
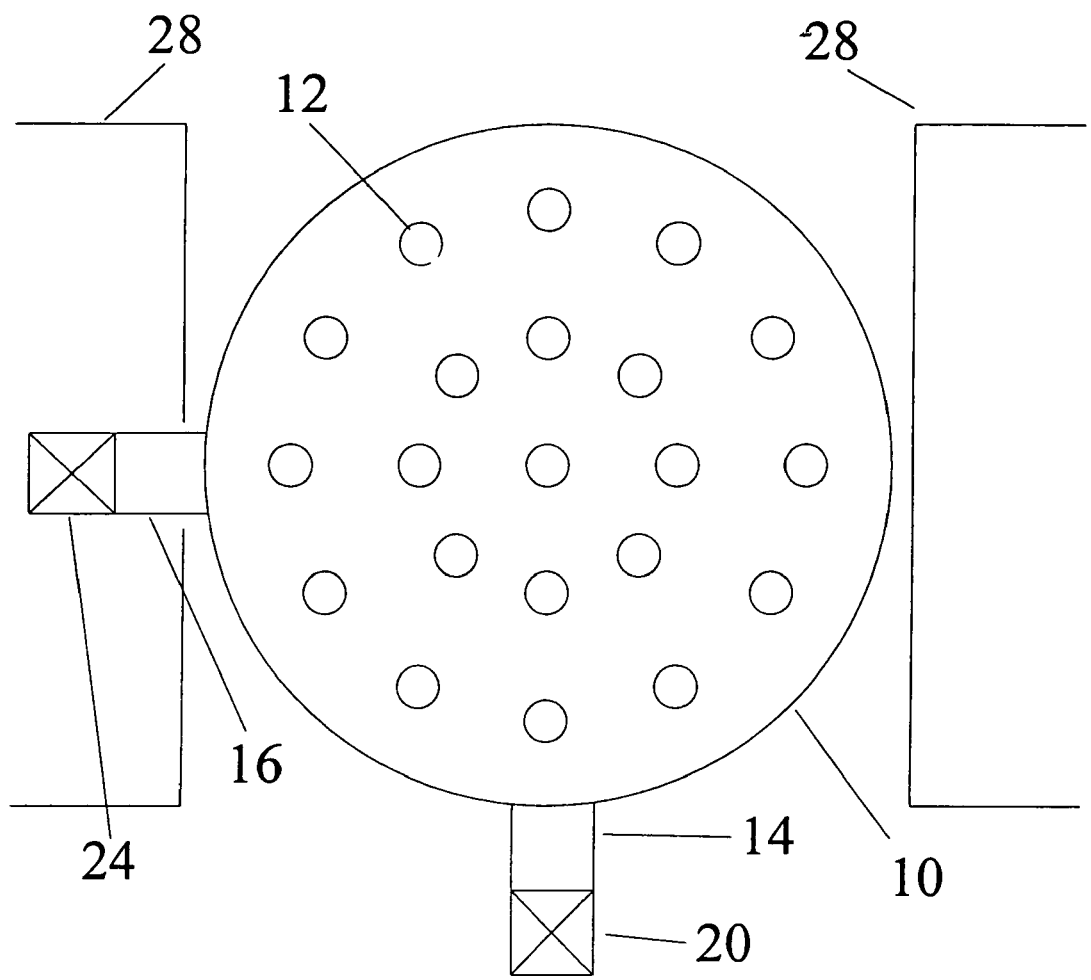
FIG. 1B is a schematic top view of the continuous magnetic separator in FIG. 1A.

Referring to FIGS. 1A and 1B, which are a front and top view of a magnetic separator, a continuous magnetic separator according to the invention is an apparatus comprising a container 10 having a slurry inlet 16, an overflow outlet 18, and an underflow outlet 14. The overflow outlet 18 is disposed at approximately the top of separator, the underflow outlet 14 is disposed at approximately the bottom of the separator and the slurry inlet 16 is disposed to deliver slurry feed between the overflow outlet and the underflow outlet. The apparatus contains at least one magnetic rod 12 disposed approximately vertically within the container. Preferably, there will be more than one magnetic rod. The rods may be made of a permanent magnet material or may be a magnetically soft material such as carbon steel or the 400 series ferritic stainless steels which is magnetized by an external magnetic field produced by an electromagnet 28 or a superconducting magnet or a permanent magnet with the field substantially transverse to the vertical orientation of the rods. When the rods are permanent magnets, preferred materials to use for separating iron based Fischer-Tropsch catalyst are alnico, ceramic ferrites, samarium cobalt, and neodymium-iron boron permanent magnets as described in "Permanent Magnet Materials and Their Application" by Peter Campbell, Cambridge University Press, 1994. Any permanent magnet can be used, subject to the condition that its Curie Temperature be at least a few degrees above the temperature at which the separation is to be carried out. The container is made from a non-magnetic material such as 316 stainless steel. When a slurry of magnetic particles is fed into the slurry inlet, the magnetic particles are attracted to the magnetic rods and are made to slide down the magnetic rods by gravity and flow forces to form a magnetic concentrate, which is a concentrated slurry of magnetic particles, which flows out through the underflow outlet, while a clarified stream, produced by removal of magnetic particles into the magnetic concentrate, exits through the overflow outlet.

It is preferable to control the performance of the separator by controlling the feed rate to the separator and varying the ratio of the rate of withdrawal of magnetic concentrate to the rate of withdrawal of the clarified stream. The preferred embodiment of the continuous magnetic separator further comprises flow control means for controlling the ratio of the rate of withdrawal of magnetic concentrate to the rate of withdrawal of the clarified stream. Examples of flow control means include valves, flow restrictions, and pumps located in series with the overflow outlet and/or underflow outlet. The preferred embodiment further comprises means for controlling the slurry feed rate to the separator. The preferred means for controlling feed rate includes valves, flow restrictions and pumps in series with the inlet. For a particular separator the preferred means of controlling the feed rate and ratio of underflow rate to overflow rate depends on the environment in which the continuous magnetic separator is used, and will be discussed in greater detail with respect to the preferred embodiments.

Figure 2:
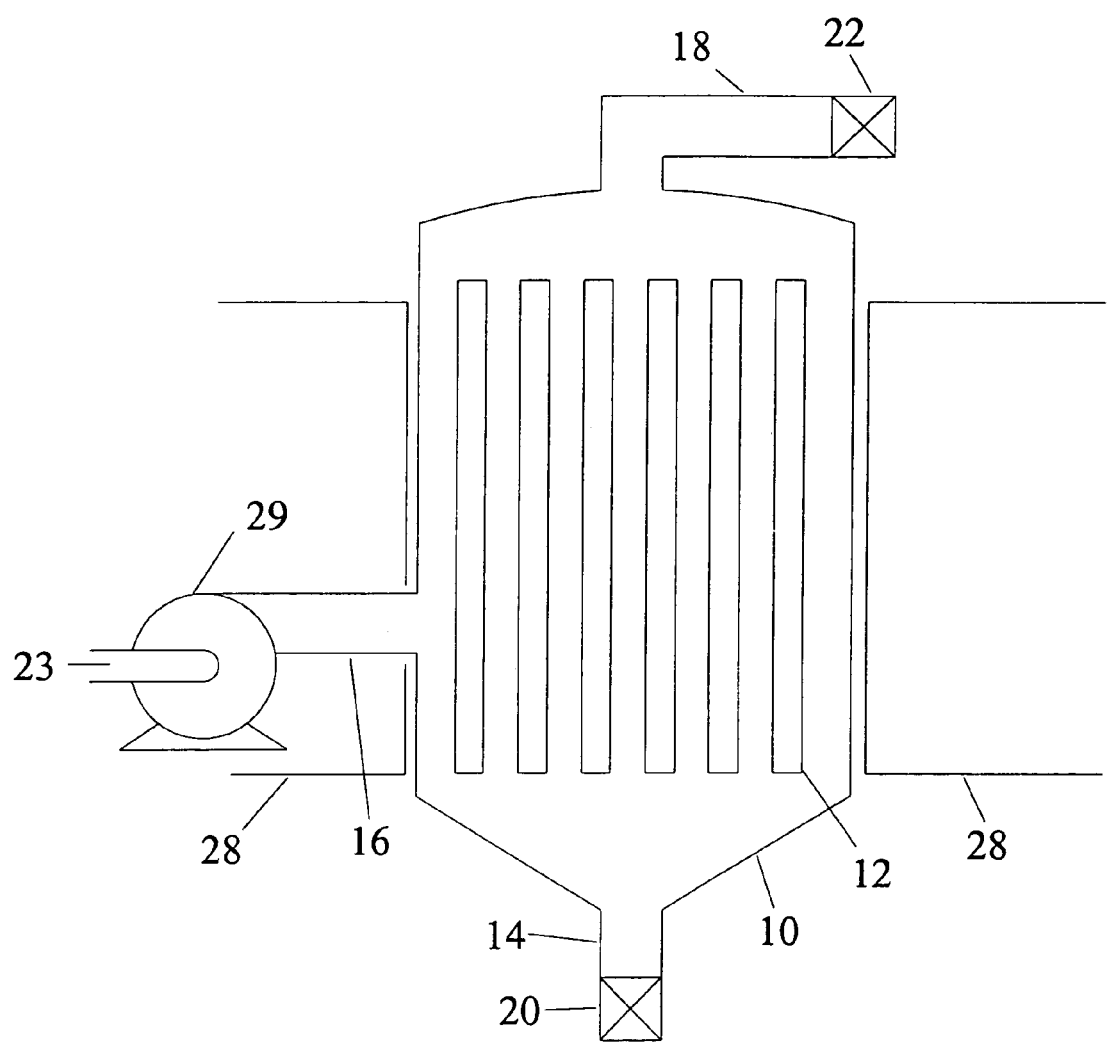
FIG. 2 is a schematic front view of a continuous magnetic separator using a pump to control the inlet feed slurry and valves to control the overflow and underflow outlets.
Figure 3:
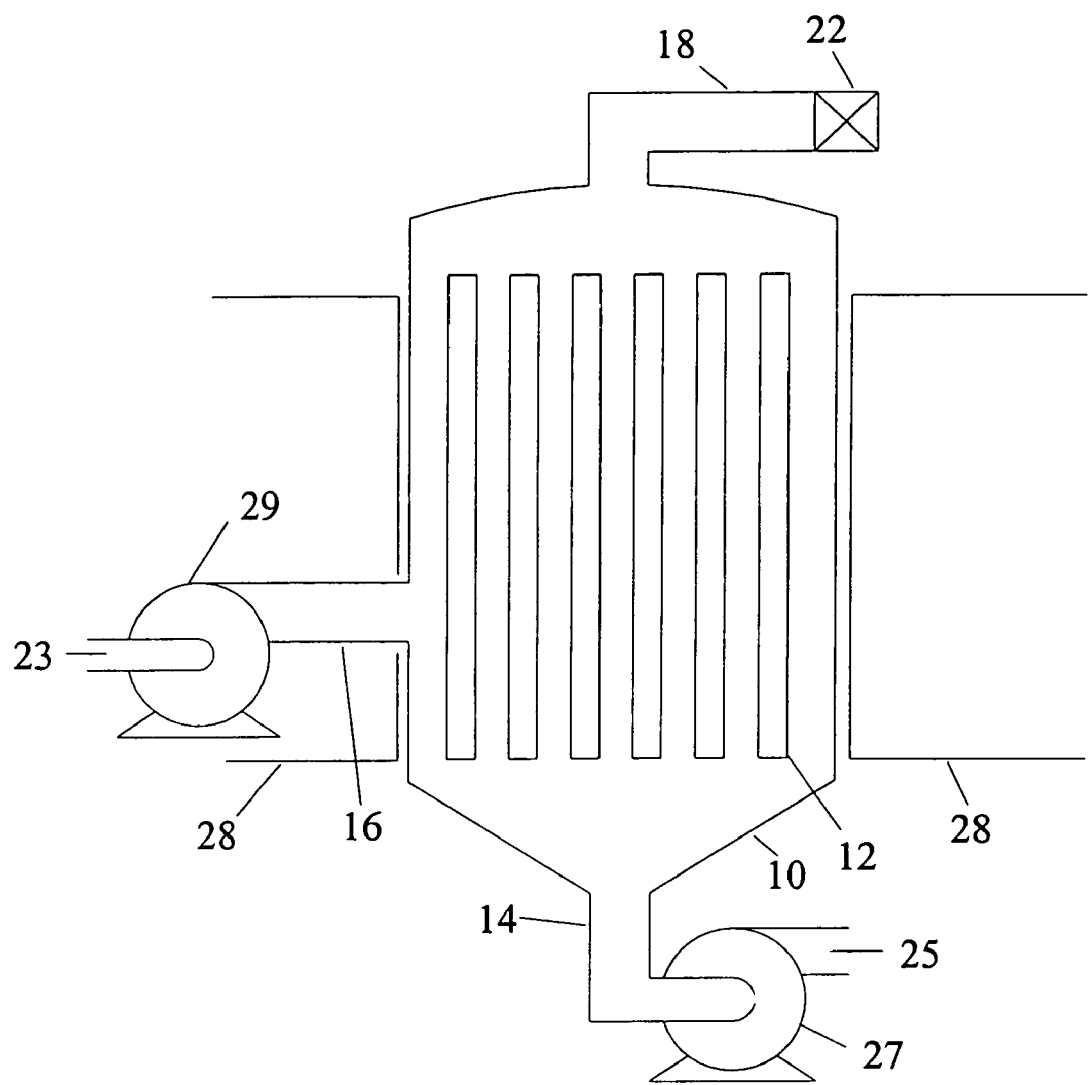
FIG. 3 is a schematic front view of a continuous magnetic separator using a pump to control the inlet feed slurry rate and underflow rate and a valve to control the overflow rate.

Again referring to FIG. 1A, FIG. 2 and FIG. 3, examples of flow control means include valves 20, 22, and pump 27 or other fixed flow restrictions such as orifices, whose use is well known to those skilled in the art, which may be located in series with the overflow outlet and/or underflow outlet. Examples of feed rate control means comprise valve 24 and pump 29. As will be discussed later, the preferred control means will depend on the particular embodiment of the invention, so that controls will not necessarily be needed for each of the entrance and exit ports in each embodiment.

Figure 4:
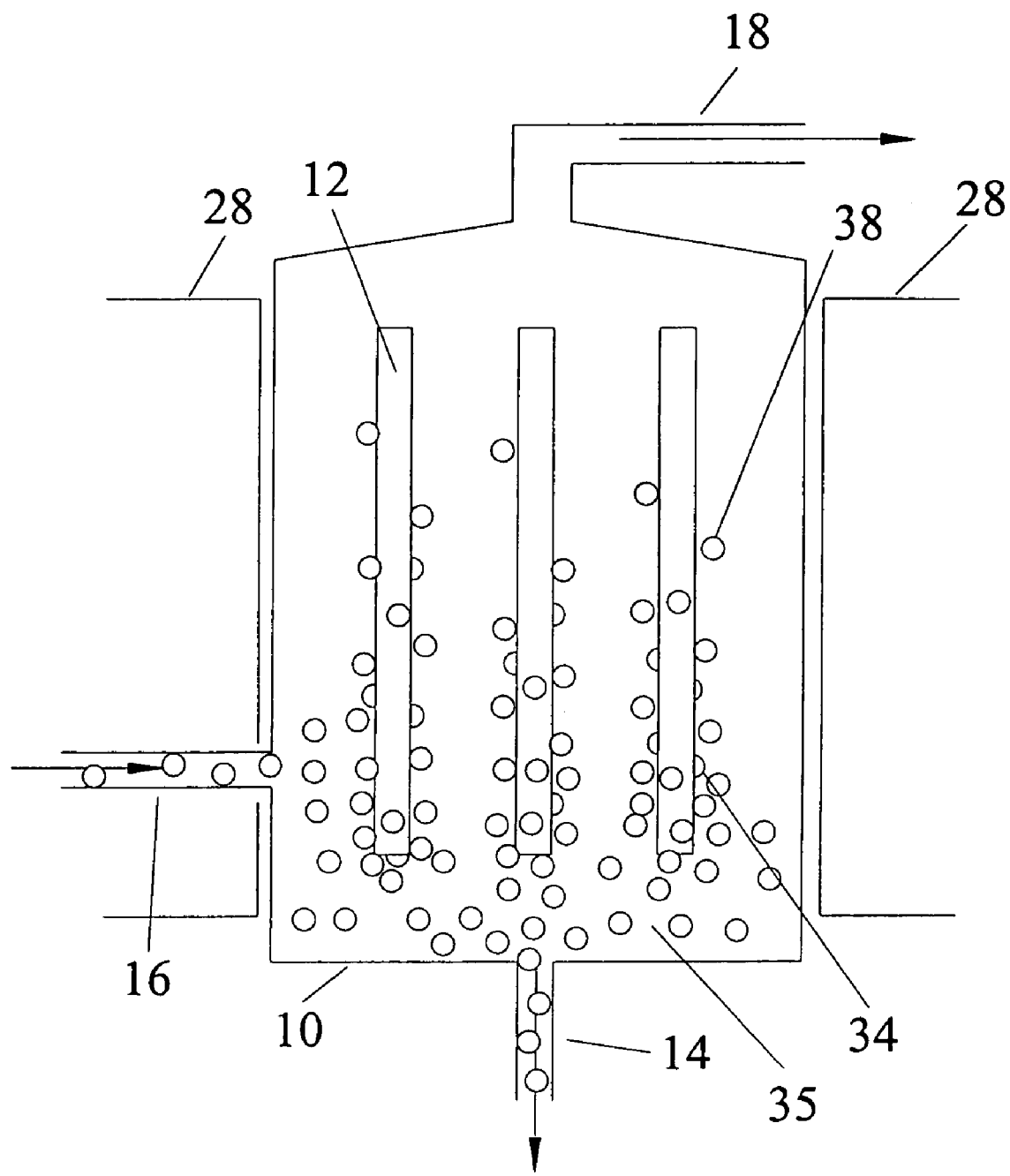
FIG. 4 is a schematic front view of a continuous magnetic separator during operation.
Figure 5:
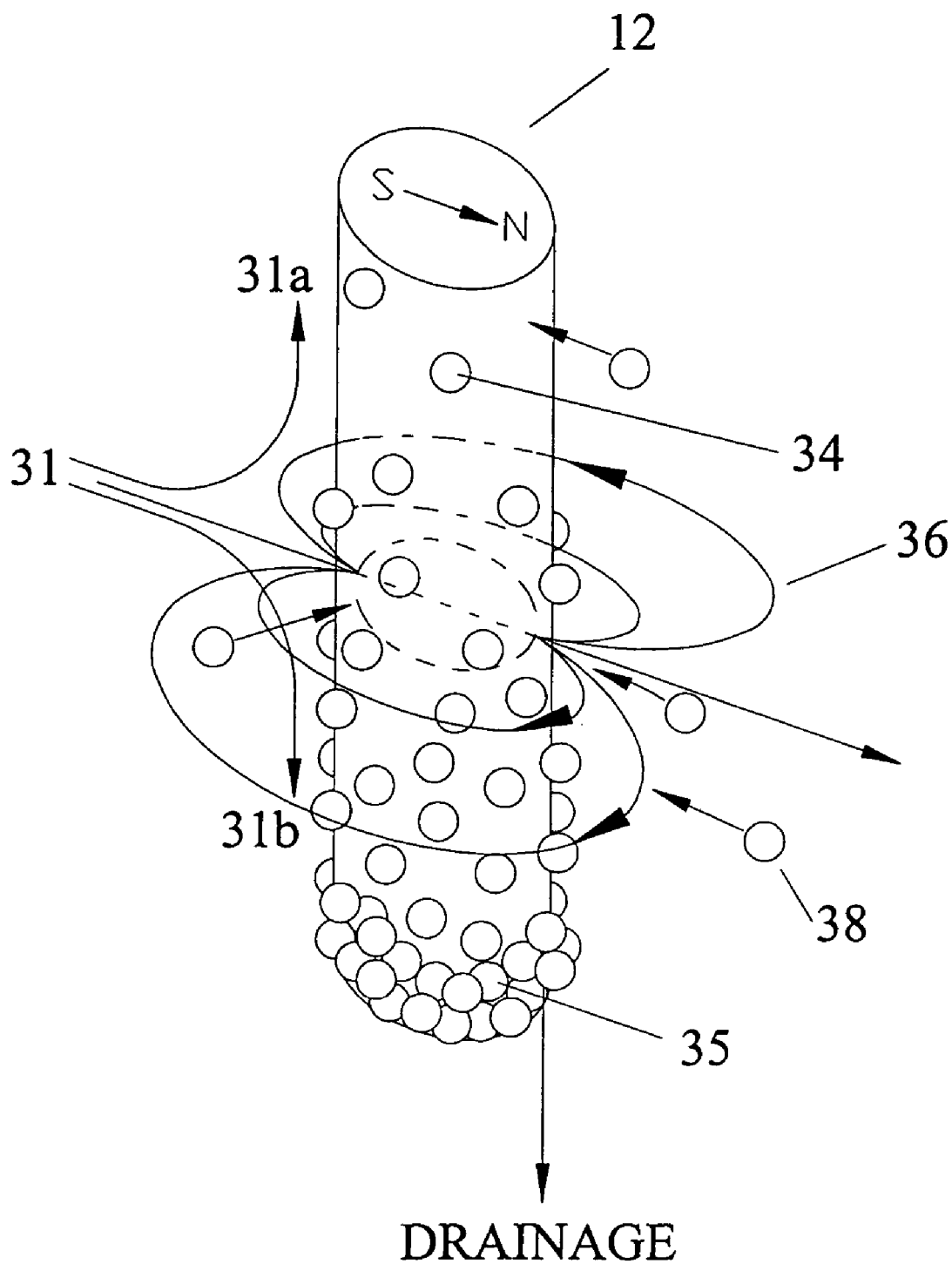
FIG. 5 is a drawing of a magnetic rod during operation.

FIG. 4 shows a magnetic separator between the poles of an electromagnet during operation, and FIG. 5 shows a single magnet rod of a magnetic separator. Particles 38 attached to the rod represent magnetic particles which have been separated from the slurry. Referring to FIG. 4 and FIG. 5, several rods 12 are mounted in a container 10. Rods 12 may be permanent magnets or may be a magnetically soft material such as carbon steel or the 400 series ferritic stainless steel, which is magnetized by an external magnetic field produced by an electromagnet 28 or a superconducting magnet or a permanent magnet with the field substantially transverse to the vertical orientation of the rods, and have a fringing field 36. The slurry flow 31 is visualized as splitting into two flows filling the space around the rods. One, 31a, flows upward, the other, 31b, flows downward. Magnetic particles 38 are attracted to the rods 12 where they build a layer of particles 34 until sliding friction derived from the magnetic compressive force can no longer support their weight. The particles slide down the rods and form a magnetic concentrate 35 at the bottom of the rods. Once this weight is too great to be supported magnetically, a high concentration slurry will flow continuously from the bottom of the separator (underflow outlet). A clarified slurry with a low concentration of magnetic particles flows from the overflow outlet 18.

A somewhat different embodiment of a magnetic separator, of the type where the rods are magnetized by an external field, is shown in vertical section in FIGS. 6A, 6B, and 6C. The previously described embodiments of continuous magnetic separators were illustrated with a container which has the general shape of a vertical cylinder with vertical rods disposed within the container which are generally parallel to the axis of the cylinder. Flow into the vertical cylinder could be axially, up or down, radially, or tangentially. An alternative embodiment is shown in FIGS. 6A, 6B, and 6C. FIGS. 6A and 6C are end and top views respectively and 6B is a view from the side of a vertical section through a magnetic separator contained within a solenoid magnet. Referring to FIGS. 6A, 6B, and 6C, a magnetic separator is shown comprising a container 48 having two slurry inlets 42, an overflow outlet 40, and an underflow outlet 41. The container 48 has the general shape of a horizontal cylinder with rods 43 hanging inside the container 48 in a generally vertical position which is perpendicular to the axis of the cylinder. In this embodiment, the container is surrounded by a solenoid magnet that generates a magnetic field transverse to the hanging rods. The solenoid magnet is shown comprising an iron frame 47 and pole pieces 45 and 46 surrounding the solenoid 44.

The operation of the novel separator is governed by magnetic and flow forces under the influence of flow restrictors which force the majority of the flow out the underflow exit. The separator is designed to produce an overflow in which the concentration of magnetic particles is greatly diminished and an underflow carrying the greatest portion of the particles in a substantial portion of the incoming fluid. Flow restrictors are employed to force the greatest flow through the underflow exit.

When the slurry of magnetic particles enters the cell, the flow moves in and around the rods more or less transverse to their lengths. Whenever the magnetic particles in this flow come within a certain distance from the surfaces of the rods, called the capture radius, they will be attracted toward the rods thus separating the particles from the fluid which brought them near the rods. Some particles will collide with the rods and will stick to their surface, depending upon flow conditions around the rods. Others will be entrained in the flow moving to the underflow exit. The fluid from which the particles has been separated is lighter than the slurry and will rise in the separator and exit at the overflow outlet. The concentrated slurry is forced to flow out of the separator at the bottom. The ratio of the overflow rate and the underflow rates is adjusted by flow restrictors on the overflow and the underflow. This arrangement drags the majority of the particles out the underflow.

Without being bound to the theory, as an approximation, the probability of capture on the magnetic rod in the continuous magnetic separator is related to the ratio of the time for the particle to migrate to the capture surface to the residence time in the separator. This is governed by the magnetic force on the particle, by the viscous drag on the particle, and by the time required by the liquid wax to move through the capture cell. Generally speaking, these quantities define a radius of capture for particles in flow around the magnetic element that is given by the general relationship, $$R_c/a = f(V_m/a)*T$$

where $R_c$ is the capture radius, a is the radius of the magnetic capture element, and T is the retention time in the separator with length, L, above the top of the dense phase in the bottom of the separator. For the special case of Stokes law flow, $V_m$ is the velocity of particles directed toward the capture surface when the magnetic force and the viscous drag are equal. In that case, a dimensionless parameter can be defined which helps to identify the important physical parameters controlling the separation. It is given by $$(V_m/a)*T = (L/a)*(V_m/V_f) = \rho R^2 \chi_g (M/a)^2 T/\eta$$

where $\rho$ is the particle density, R is the particle radius, $\chi_g$ is the apparent magnetic susceptibility of the particles, M is the magnetization of the magnetic element, a is its radius, and $\eta$ is the bulk viscosity of the slurry. Strictly speaking, this parameter is qualitative at best for capturing magnetic particles since they accelerate toward the magnetic elements.

When the magnetic forces are too high, and the underflow rate is too low, bridging can develop between the rods. When this happens, the bridge will grow, and eventually the separator will plug. There is a balance between the magnetic capture and fluid drag forces that will permit optimal flow without retention in a particular system.

Again, without being bound by the theory, and as an approximation, to prevent bridging it is desirable to have the fluid drag associated with the underflow and the weight to be greater than the frictional force holding the particles to the rod. This is determined by the following inequality:

$$\frac{1}{2} C A \rho_f v^2 + mg \geq \mu m \sigma_g \frac{dB}{dx}$$

C is the drag coefficient for motion of particles relative to the fluid, a flowing suspension of magnetic particles in a liquid, A is the particle cross-sectional area transverse to the flow, $\rho_f$ is the density of the fluid, v the fluid underflow velocity relative to the particle, m the particle mass, and $\sigma_g$ its magnetization per gram, dB/dx is the gradient of the magnetic field at the surface of the rod, g is the acceleration due to gravity, and $\mu$ is the coefficient of friction. This inequality provides a method for estimating flows which prevent bridging of the particles. For example, for underflow where the Reynolds number, $\Re = vd/\eta$ is less than 0.4, Stokes law is appropriate. The viscous force, $6\pi\eta rv$, is seven times greater than the magnetic attraction, where the kinematic viscosity, $\eta$, is 0.04 Stokes, particle diameter d is 10 microns, the velocity v is 4 cm/sec. This is for a particle of density 7.5 gm/cc with magnetic moment $\sigma_g = 20$ emu/gm at the surface of an alnico permanent magnet which is ⅛ inch diameter. The surface field strength is 850 gauss and the field gradient is 2700 gauss²/cm.

The above inequality is written for a vertical rod with the magnetic field transverse to the rod. It is anticipated that this situation will be preferred in most separators. However it is not necessary for the rod to be perfectly vertical and if not, the inequality can be written in terms of the component of magnetic force normal to the actual orientation of the rod and the gravitational force component parallel to the rod.

The separator itself has an internal impedance to flow which changes with time until steady state flow conditions are developed. The slurry entering through inlet port 16 immediately encounters the magnetized rods. Magnetic particles flowing within a capture radius of the rods surface will migrate to the rod and stick to its surface, separating them from flow. As inlet slurry flow continues, more particles are captured and a layer of particles accumulates on the surfaces of the rods. Once the layer becomes sufficiently thick, the magnetic compressive force is unable to support its weight. Downward flow in the separator will, then, drag particles off of the rods. This is the balance expressed by the above inequality. Once particles build a thick layer on the rods, the space for flow becomes restricted and the local flow velocity increases, thus increasing the downward drag tending to take the particles out of the separator. There is a balance that must be struck in operation of the separator where the local viscous drag and the weight of the particles combine to overcome the upward directed friction force caused by magnetic compression which tends to keep the particles in place on the rods The operation of the continuous magnetic separator is certainly more complex than the inequality expressed above and the inequality is not intended to be limiting on the method and bounds of the invention. That is, meeting the criteria does not guarantee acceptable operation and failure to meet the criterion does not guarantee failure. However, those skilled in the art will appreciate that experimental testing is customarily employed to guide the design and operation of equipment such as is used in this invention. An example of the type of testing used is illustrated in Example 1, below. The theory expressed will be useful for minimizing the amount of testing that will be required.

It may be necessary to use two or more continuous magnetic separators in series to optimize performance. One preferred arrangement is to have a first separator with large diameter rods to produce at intermediate quality of clarified liquid followed by a second separator using the clarified liquid product from the first unit as its feed. The second separator preferably has more rods than the first unit and the rods preferably have a smaller diameter.

An operating variable affecting the practicality of the application is the recycle ratio ("R"), which is defined as the ratio of the flow rate of the underflow stream to the flow rate of the clarified overflow product stream. This directly affects the size of the separator required to produce a fixed output. Generally, it is preferred to operate a continuous magnetic separator by directly controlling the ratio R, preferably by controlling two of the three variables inlet slurry rate, clarified liquid rate, and magnetic concentrate rate. In the above example, for a recycle ratio of R=10, the overflow rate is 98 $cm^3$/sec when the underflow rate is 980 $cm^3$/sec and the feed rate is 1078 $cm^3$/sec.

It has been noted that the preferred means of controlling the feed rate and ratio of underflow rate to overflow rate depends on the environment in which the continuous magnetic separator is used. In one environment, the continuous magnetic separator is operated decoupled from the source of slurry, with the slurry being stored in a storage vessel. This environment is typical, for example, for separating magnetic particles from lubricating oil. In this case the feed rate can be controlled using a control valve if the slurry is stored under an approximately constant pressure or with a controllable output pump if the slurry pressure is insufficient or not sufficiently constant. Once the feed rate is set, the split between the input and output will preferably be controlled by valves on one or both of the streams, or a pump on one stream, or a pump on one stream and a valve on the other, or flow restrictors (such as pipe diameter) on one or both streams.

In a second environment, the continuous magnetic separator is directly coupled with the source of slurry feed. One particularly attractive environment occurs when a continuous magnetic separator is used to separate magnetic particles from the slurry in a slurry phase reaction system such as Fischer-Tropsch synthesis. In a slurry phase Fischer-Tropsch process synthesis gas comprising carbon monoxide and hydrogen is added to a slurry phase in a reactor which is at appropriate elevated temperature and pressure. The slurry phase is made of a liquid phase comprising hydrocarbons produced from the synthesis gas, including waxes. The solid phase comprises catalyst particles. A common catalyst family for Fischer-Tropsch synthesis comprise iron as a major component and are strongly magnetic. In a slurry phase Fischer-Tropsch process the liquid phase is a portion of the hydrocarbon product which is formed by the catalytic reaction of carbon monoxide and hydrogen. The liquid contains waxes that will generally be upgraded by refining processes. It is necessary to remove the catalyst particles from the liquid in order to facilitate further refining of the liquid as well as to recover the valuable catalyst for recycle.

Figure 7:
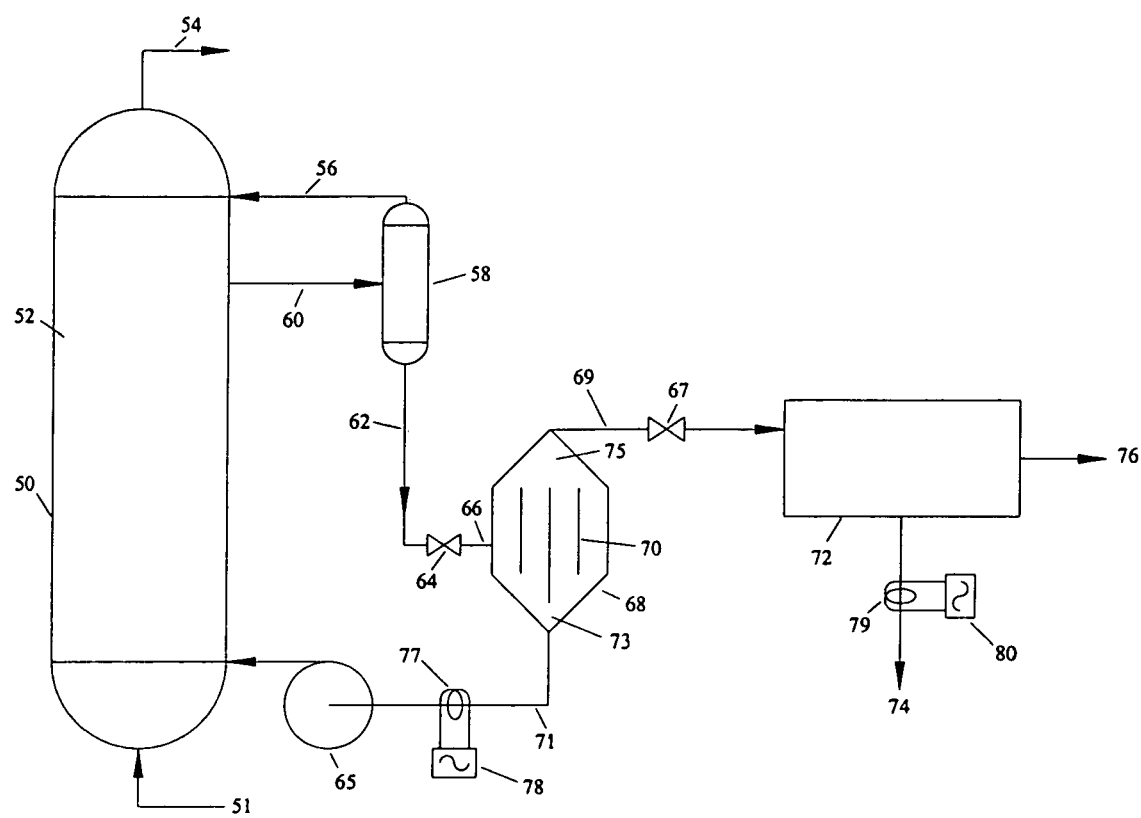
FIG. 7 shows a magnetic separator externally coupled with a slurry reactor.

In one preferred embodiment involving coupling the continuous magnetic separator with a slurry reactor, the continuous magnetic separator is located outside of the slurry reactor and serving to clarify the reactor slurry of magnetic catalyst particles. This embodiment is illustrated in FIG. 7. In this embodiment the slurry feed rate is set by the production of the slurry in the slurry reactor, often controlled by maintaining a constant level in a vapor liquid separator with a control valve. In this case it will be desirable to pressure the slurry produced into the slurry inlet of the continuous magnetic separator in order for it to continuously flow into the separator. It will also be desirable to control the split between the overflow and the underflow with valves or pumps on the overflow outlet or the underflow outlet or both. The choice of a valve or pump is dictated, in this case by the use planned for the magnetic concentrate. If the magnetic concentrate is to be recycled to the slurry reactor, a pump will be desirable since the pressure of the magnetic concentrate will need to be raised back to the pressure of the slurry reactor.

FIG. 7 is a flow diagram of one preferred embodiment of the invention. In the figure a Fischer-Tropsch reactor 50 with a slurry zone 52 contains a liquid comprising waxes made in the reactor and solid magnetic catalyst particles. Synthesis gas comprising hydrogen and carbon monoxide is added at the bottom of the reactor at line 51. Vapors are removed from the reactor through line 54. Slurry is drawn from the slurry zone 52 through line 60 into vapor liquid separator 58. Vapors are returned through line 56. The slurry flows through line 62 and then through valve 64 into the slurry inlet 66 of the continuous magnetic separator 68. The slurry proceeds around the magnetic rods 70 such that the magnetic particles are attracted to the rods and then move down the surfaces of the rods under the influence of gravity and flow forces. The particles separated from the slurry form a magnetic concentrate 73 at the bottom of the continuous separator. The magnetic concentrate exits through line 71 to the inlet of pump 65 from where it is pumped back into the reactor to recycle the catalyst particles. The exit stream 71 is shown passing through a demagnetizing coil 77 which is energized through a power supply 78. The coil and supply are of the type supplied by R. B. Annis Co., Inc., Indianapolis, Ind., and can be purchased from McMaster Carr Supply Company of Cleveland, Ohio. The demagnetization operation is optional. It can be employed to break up magnetic agglomerates for catalyst particles which exhibit hysteresis with a large remnant magnetization. Otherwise it is unnecessary. A clarified liquid 75 forms from the slurry with the magnetic particles removed at the top of the continuous magnetic separator. The clarified liquid exits through line 69 and then through valve 67 to a secondary separator 72 wherefrom a further clarified liquid is withdrawn through line 76 and additional magnetic particles are withdrawn through 74. The exit stream 74 from separator 72 passes through optional demagnetization coil 79 which is energized by power supply 80. A preferred secondary separator is a high gradient magnetic separator, though other filters may be used as well. Note that the secondary separator 72 is shown as a conceptual block and the feed and product arrows are not indicative that the process conducted therein is a continuous process. It is not as important that this process step be continuous since it is not integrated into the synthesis process.

Operation of the separator 68 shown in FIG. 7 is redundant. In the figure, operation of the separator 68 is controlled by inlet valve 64, overflow valve 67, and slurry pump 65. Flow restrictors, such as valves or pipe orifices, and pumps are an integral part of this invention and are required for control of its operation. However, in most cases control devices are not necessary on all three connections to the separator, feed, overflow, and underflow. The valve 64 is primarily used to keep a constant slurry level in the reactor 52. Any two control devices can be used and in the special case where flow from the column reactor is reasonably steady and sufficient to force flow through the separator, and the weight of the column of underflow is sufficient to cause it to flow back into the column reactor, 50, only one control valve is required. Pump 65 is unnecessary. If in this case, one is to control the ratio of flows in the overflow and underflow outlets, however, two controls are required, one on the overflow and one on the underflow. For the case where iron catalysts which are sensitive to the decrepitating action of pumps and valves are being employed, one can use a control valve in the overflow outlet and a restricted pipe diameter in the underflow 71 to control the ratio of the flows. The catalyst particles in the overflow stream are generally of smaller particle size than those in the underflow stream. With this configuration of controls, the effects of particle size diminution are minimized, especially if the fine particles are not to be returned to the column reactor. The continuous magnetic separator is shown in FIG. 7 without an external magnet, though it could just as well be of the type shown in FIG. 1 with an external magnet, such as an electromagnet, a superconducting magnet, or a permanent magnet. Also, while the reactor and reaction system have been described in terms of a Fischer-Tropsch reactor, the invention could just as well be another reaction carried out in a slurry comprising a liquid and a strongly magnetic solid slurried therein.

Also the need for a secondary separator depends solely on the way that the product of the first stage separator will be used. In some cases, the product made from the continuous magnetic separator may not need to be processed through a secondary separator.

Figure 8:
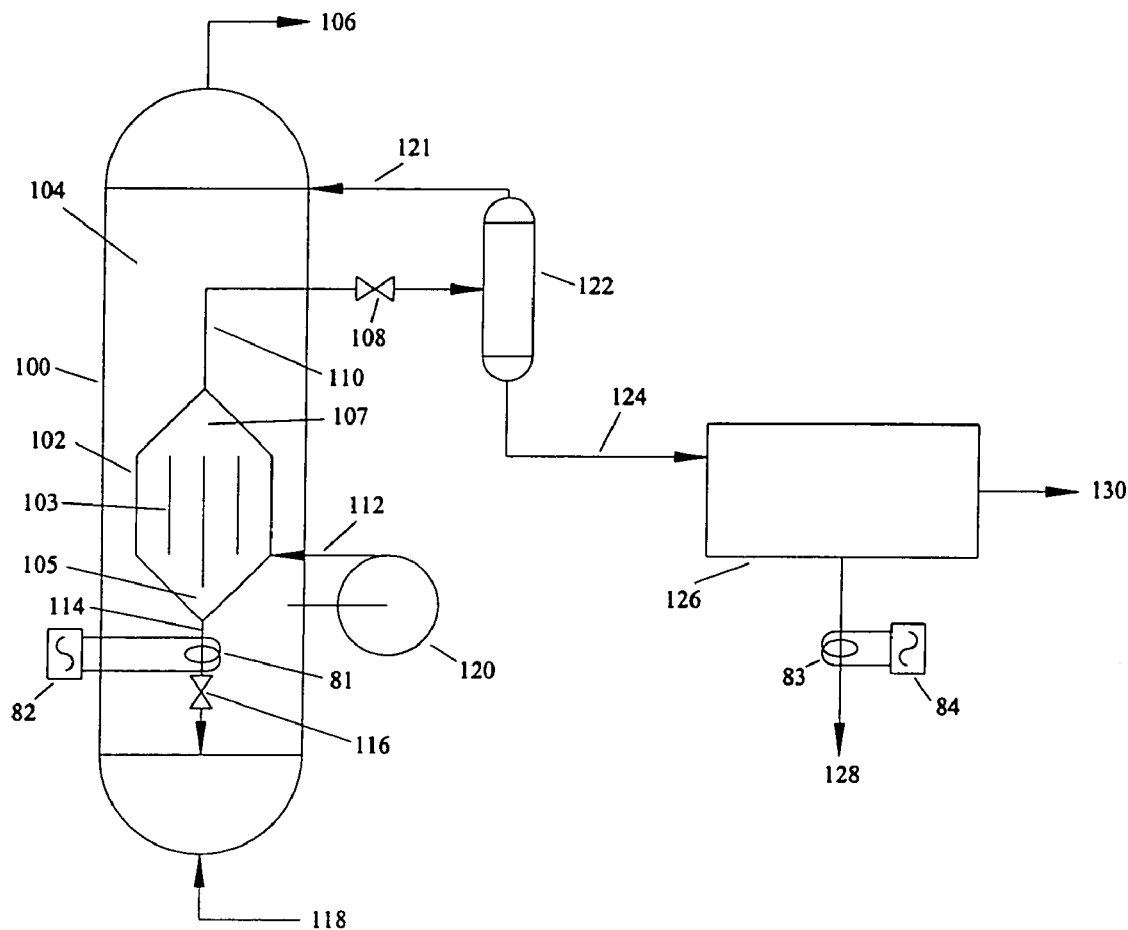
FIG. 8 shows a magnetic separator internal to a slurry reactor.

In a second preferred embodiment involving coupling the continuous magnetic separator with a slurry reactor, the continuous magnetic separator is located within the reactor slurry zone so that the clarified liquid is removed from the slurry zone through an outlet from the reactor and the magnetic concentrate slurry is returned to the reactor slurry zone, preferably at a position near the bottom of the slurry zone. This embodiment is shown in FIG. 8. In this embodiment the slurry is preferably continuously pumped into the slurry inlet by a pump that draws slurry from the reactor slurry zone. The pump may be of the type that is internal to the reactor, such as a canned pump, or may be outside of the reactor drawing slurry through a nozzle extending through the reactor. In this case the split between overflow and underflow is preferably controlled by control valves on either the overflow outlet, the underflow outlet or both Referring to FIG. 8, a continuous magnetic separator 102 is mounted within a Fischer-Tropsch reactor 100, preferably within the slurry zone 104. Synthesis gas 118 is pumped into the reactor 100 and reacts with strongly magnetic catalyst particles present in the slurry zone to form hydrocarbon liquids including waxes which is the liquid component of the slurry. Slurry is pumped into the slurry inlet 112 of the continuous magnetic separator 102 from the discharge of pump 120 which draws its inlet from the slurry zone 104. The pump 120 is shown exterior to the reactor, though it can also be a pump, such as a canned pump, which is submerged within the reactor, preferably within the slurry zone. Strongly magnetic particles of iron based Fischer-Tropsch catalyst are drawn to magnetic rods 103 and are made to slide down the rods by gravity and flow forces to form a magnetic concentrate 105 at the bottom of the continuous magnetic separator which flows through the underflow outlet 114 through demagnetizing coil 82 and valve 116 into the slurry zone 104 of the reactor. The exit stream 114 is shown passing through a demagnetizing coil 81 which is energized through a power supply 82. The coil and supply are of the type described above. The demagnetization operation is optional. It can be employed to break up magnetic agglomerates for catalyst particles which exhibit hysteresis with a large remnant magnetization. Otherwise it is unnecessary. Valve 116 could be replaced by a flow restrictor such as a pipe of fixed inside diameter. Clarified liquid 107 is formed from the slurry and flows through the top of the continuous magnetic separator to the overflow outlet 110 and then through valve 108. The clarified liquid flows into separator 122. The gaseous product is returned to the top of the reactor through 121 where it joins the other gaseous products and exits through line 106. In this embodiment the preferred method of controlling the ratio of clarified liquid to magnetic concentrate is manipulation of valves 108 and pump 120. Valve 116 is not used. If the continuous magnetic separator 102 operates at the same pressure as the reactor 100, the flow through the separator is controlled by manipulation of valves 108 and 116. Similarly to the first preferred embodiment, the clarified liquid flows into a secondary separator 126, wherefrom a further clarified liquid 130 is withdrawn and the magnetic solids 128 are withdrawn through demagnetizing coil 83 which is energized by power supply 84. The demagnetizing coil 83 is optional. If the catalysts 128 exhibit hysteresis with a large value of remnant magnetism and are to be returned to the reactor, then demagnetizing coil 83 can be used to break up magnetic agglomerates if desired. Otherwise, the coil would not be used.

In the preferred embodiment with the continuous magnetic separator within the reactor, it is preferred that the rods be permanent magnets rather than being magnetized by an external magnet. It is certainly possible, however to use an external superconducting magnet, though the cost would probably be higher because of the large size of the magnets placed outside the Fischer-Tropsch reactor. It is certainly possible that large-scale high temperature superconductors would substantially reduce the cost of this option.

EXAMPLE 1

Testing of a Continuous Magnetic Separator—Room Temperature Tests on a Continuous Magnetic Separator Using an External Electromagnet A continuous magnetic separator was tested in the laboratory at conditions chosen to simulate a Fischer-Tropsch reaction slurry. The tests were run with an iron-based catalyst that is a precipitated iron catalyst with a atomic ratio of 100 Fe: 4.4 Si. The catalyst was supplied in the unactivated form. Hexadecane was chosen to be used as an analog liquid for room temperature experiments. The analog was chosen to have a room temperature density and viscosity similar to the F-T waxes at process temperatures. Hexadecane has a density of 0.7733 g/ml, and a viscosity of 3.3 cP, which are very close to the densities (0.625-0.9317 g/ml) and viscosities (2.4-11.9 cP) for F-T waxes reported in the literature (see, Zhou, P. Z., "Status Review of Fischer-Tropsch Slurry Reactor Catalyst/Wax Separation Techniques," Prepared by Burns and Roe Services Corporation for the U.S. DOE Pittsburgh Energy Technology Center under Contract No. DE-AC22-89PC88400, Subtask 43.02, February 1991; and Marano, J. J. and Holder, G. D. "Prediction of Bulk Properties of Fischer-Tropsch Derived Liquids," *Ind. Eng. Chem. Res.*, 36: 2409-2420, 1997, both of which are incorporated herein by reference). The catalyst was activated in Durasyn® 164 Polyalphaolefin (BP Amoco Chemicals Company, Naperville, Ill.) at a concentration of 50 Wt. % solids. The activated catalyst slurry was diluted with hexadecane to a concentration of 20 Wt. % solids. Hexadecane and Durasyn were therefore in a ratio of 3:1, which had a density of 0.785 g/ml and a viscosity of 6.5 cP. About 60% of the activated catalyst was smaller than 25 microns.

The continuous magnetic separator container was a 23 cm long brass vessel with a 1.8 cm×3.5 cm internal cross section and contained carbon steel rods which were nine inches long and 0.063 inches in diameter. Either 2 or 4 rods were used.

The tests were conducted in a continuous loop circuit, where slurry was circulated out of a reservoir, pumped to the inlet of a continuous magnetic separator, separated into a clarified liquid overflow and a magnetic concentrate underflow, recombined and returned to the reservoir. The overflow and underflow were periodically sampled and analyzed.

For the separation experiments, 700 g of the activated catalyst/Durasyn oil slurry were diluted to 20 Wt. % solids with hexadecane or Durasyn oil for the low temperature and high temperature experiments, respectively. The 20 Wt. % slurry was placed in a 4 L stainless steel beaker, which was the reservoir. An impeller (T-Line Laboratory Stirrer, Talboys Engineering Group, Emerson, N.J.) was used to keep the catalyst from settling in the beaker. A peristaltic pump (A-Series Peristaltic Pump, Manostat, New York, N.Y.) was used to pump the slurry into the separator slurry inlet. Teflon tubing was used to return the clarified liquid and underflow streams to the beaker reservoir. Every 30 minutes samples of the product and underflow streams were withdrawn for analysis. After analysis was completed (approximately 5-10 minutes), the samples were returned to the feed container. The recycle ratio was adjusted by means of pinch clamps on the tubing for the overflow and underflow streams. An exact recycle ratio could not be chosen precisely because only coarse adjustments were possible with the pinch clamps.

The test results are summarized in Table 1.

TABLE 1

Test Results For Room Temperature Testing with an Electromagnet

| Flow Rate (ml/min) | Applied Magnetic Field (Gauss) | Number of Rods | Recycle Ratio | Product Concentration (Wt. % catalyst) |
|---|---|---|---|---|
| 260 | 2400 | 2 | 14 | 0.88 |
| 280 | 2400 | 2 | 30 | 0.37 |
| 520 | 5000 | 2 | 6 | 0.57 |
| 520 | 6600 | 2 | 6 | 0.13 |
| 800 | 0 | 2 | 10 | 23.12 |
| 820 | 1600 | 2 | 9 | 1.34 |
| 740 | 1600 | 4 | 8 | 1.16 |
| 800 | 1600 | 4 | 21 | 0.22 |
| 820 | 3300 | 2 | 9 | 0.18 |
| 810 | 5000 | 2 | 8 | 0.16 |
| 850 | 6600 | 2 | 6 | 0.10 |
| 1540 | 5000 | 4 | 8 | 0.26 |
| 1610 | 5000 | 4 | 42 | 0.18 |
| 1560 | 6600 | 2 | 10 | 0.67 |
| 1460 | 6600 | 4 | 7 | 0.24 |
| 2360 | 5000 | 4 | 9 | 1.04 |
| 2250 | 5000 | 4 | 16 | 0.22 |

Catalyst concentrations as low as 0.1% were obtained. No separation was noted without an applied magnetic field. The tests processed up to 650 cell exchanges showing no accumulation of catalyst build up.

The above tests used either 2 rods (0.70% of the cross-sectional area of the separator) or 4 rods (1.3% of the cross-sectional area of the separator). Increasing the number of rods produced a lower catalyst content of the clarified liquid up to the point when operational difficulties occur due to solids bridging between rods. Difficulties (plugging) were increasingly observed when the number of rods was increased from 8 to 21 rods. With 21 rods the separator plugged completely. Bridging was not observed in the tests with 2 or 4 rods. It is apparent from Table I that flow rate, magnetic field, number of rods, and the recycle ratio can be traded off to achieve desired levels of catalyst in the overflow. Although not shown here, magnetic rod diameter is also a process parameter since the rod diameter affects the magnetic field gradient and thus the magnetic force.

EXAMPLE 2

High Temperature Runs

Tests at 200° C. showed similar results to the room temperature results in Table 1, showing concentrations between about 0.1% and 0.3% catalyst in the clarified liquid for Recycle Ratios between R=5 and R=9 with 4 rods at a feed flow rate of 740 cm$^3$/min and a magnetic field of 2800 Gauss.

EXAMPLE 3

Separation with Permanent Magnets

A test of permanent magnets was made with a cell containing 4 alnico permanent magnets, 8 inches long and 0.125 inches OD. The catalyst concentration was reduced from 20% to 2% in that test. It is anticipated that substantially lower product concentrations will be achieved for an optimized system, comparable to those obtained with a external magnet.

EXAMPLE 4

Secondary Treatment with High Gradient Magnetic Separation

Treating the clarified liquid with high gradient magnetic separation (HGMS) to further reduce catalyst concentration has shown that the concentration can be reduced at least as low as 500 ppm.

The invention provides a continuous magnetic separator and method for continuously separating strongly magnetic particles from a slurry producing a continuous flow of a clarified stream and a continuous flow of slurry that is concentrated in magnetic particles from a continuous slurry of magnetic particles in a liquid.

The invention is suitable for use in separating magnetic particles from a slurry in a slurry reaction system and can be incorporated within a slurry reactor.

What is claimed is:

1. A method of continuously separating a slurry comprising magnetic particles into a clarified stream and a thickened stream consisting essentially of the steps of: a) providing a substantially vertical magnetic separator comprising a container having a top portion and a bottom portion, generating at least one gradient magnetic field within said container and disposed in a substantially vertical orientation, providing an overflow outlet on the top portion of said container, providing an underflow outlet on the bottom portion of said container, and providing at least one slurry inlet on said container disposed to introduce a flow of slurry feed between said overflow outlet and said underflow outlet; b) introducing a continuous flow of feed slurry, said feed slurry comprising Fischer-Tropsch liquid containing waxes and magnetic catalyst particles into said at least one slurry inlet, wherein said feed slurry is characterized by a concentration of magnetic particles therein; c) withdrawing a continuous flow of overflow slurry comprising Fischer-Tropsch liquid containing waxes and magnetic catalyst particles from said overflow outlet, wherein said overflow slurry is characterized by a concentration of magnetic catalyst particles therein which is less than the concentration of magnetic catalyst particles in the feed slurry; and d) withdrawing a continuous flow of underflow slurry comprising Fischer-Tropsch liquid containing waxes and magnetic catalyst particles from said underflow outlet, wherein said underflow slurry is characterized by a concentration of magnetic catalyst particles therein which is greater than the concentration of magnetic catalyst particles in the feed slurry.

2. A method of continuously separating a slurry comprising magnetic particles into a clarified stream and a thickened stream consisting essentially of the steps of:
   a) providing a substantially vertical magnetic separator comprising a container having a top portion and a bottom portion, at least one magnetic rod mounted fixedly within said container and disposed in a substantially vertical orientation, an overflow outlet on the top portion of said container, an underflow outlet on the bottom portion of said container, and at least one slurry inlet on said container disposed to introduce a flow of slurry feed between said overflow outlet and said underflow outlet;
   b) introducing a continuous flow of feed slurry, said feed slurry comprising Fischer-Tropsch liquid containing waxes and magnetic catalyst particles into said at least one slurry inlet;
   c) withdrawing a continuous flow of overflow slurry comprising Fischer-Tropsch liquid containing waxes and magnetic catalyst particles from said overflow outlet, wherein said overflow slurry is characterized by a concentration of magnetic catalyst particles therein which is less than the concentration of magnetic catalyst particles in the feed slurry; and
   d) withdrawing a continuous flow of underflow slurry comprising Fischer-Tropsch liquid containing waxes and magnetic catalyst particles from said underflow outlet, wherein said underflow slurry is characterized by a concentration of magnetic catalyst particles therein which is greater than the concentration of magnetic catalyst particles in the feed slurry.

3. The method of claim 2, wherein the magnitude of the moments of said magnetic particles are greater or equal to 1 emu/gm.

4. The method of claim 2, wherein said at least one magnetic rod is a permanent magnet.

5. The method of claim 2, wherein said at least one magnetic rod is made from one of carbon steel and ferritic stainless steel and is magnetized by an external field.

6. The method of claim 2, further comprising producing a magnetic field which is substantially transverse to the length dimension of the at least 1 magnetic rod, using an energizing device chosen from the group consisting of electromagnets, superconducting magnets, and permanent magnets.

7. The method of claim 2, further comprising adjusting the ratio of the flow rate of underflow slurry to the flow rate of overflow slurry emanating from the magnetic separator.

8. The method of claim 2, wherein the overflow slurry is passed through a secondary separator, wherein said overflow slurry is processed to produce a product stream which is characterized by a concentration of particles which is less than the concentration of magnetic particles in said overflow slurry.

9. The method of claim 8, wherein said secondary separator comprises a high gradient magnetic separator, wherein a continuous flow of overflow slurry is periodically introduced into said high gradient magnetic separator having an applied magnetic field wherein magnetic particles are removed and retained in said high gradient magnetic separator and from time to time removed by back-flushing with said applied magnetic field de-energized.

10. The method of claim 8, wherein said secondary separator is a second continuous magnetic separator.

11. The method of claim 2, wherein said magnetic catalyst particles are at least one of iron, cobalt and nickel.

12. The method of claim 2, wherein the continuous flow from the underflow outlet passes through a demagnetization apparatus.

13. The method of claim 2, wherein the magnetic catalyst particles have diameters less than 500 micrometers.

14. The method of claim 2, wherein the feed slurry has a solids content less than 50 wt. %.

* * * * *